(12) United States Patent
Gutta et al.

(10) Patent No.: US 12,141,181 B2
(45) Date of Patent: *Nov. 12, 2024

(54) DATABASE QUERY GENERATION USING NATURAL LANGUAGE TEXT

(71) Applicant: DSilo Inc., New York, NY (US)

(72) Inventors: Jaya Prakash Narayana Gutta, New York, NY (US); Sharad Malhautra, New York, NY (US); Lalit Gupta, Bangalore (IN)

(73) Assignee: DSilo Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,939

(22) Filed: Sep. 25, 2023

(65) Prior Publication Data

US 2024/0028629 A1    Jan. 25, 2024

Related U.S. Application Data

(63) Continuation of application No. 18/073,815, filed on Dec. 2, 2022, now Pat. No. 11,860,916, which is a
(Continued)

(51) Int. Cl.
*G06F 16/33*        (2019.01)
*G06F 16/31*        (2019.01)
(Continued)

(52) U.S. Cl.
CPC .......... *G06F 16/3344* (2019.01); *G06F 16/31* (2019.01); *G06F 16/3347* (2019.01);
(Continued)

(58) Field of Classification Search
CPC .. G06F 16/3344; G06F 16/31; G06F 16/3347; G06F 16/355; G06F 40/186;
(Continued)

(56) References Cited

U.S. PATENT DOCUMENTS 9,280,908 B2    3/2016  Isensee
10,509,860 B2   12/2019 Zhang et al.
(Continued)

OTHER PUBLICATIONS

Non-Final Office Action issued in U.S. Appl. No. 18/108,116, dated Aug. 23, 2023, pp. 1-24.
(Continued)

*Primary Examiner* — Abdelali Serrou
(74) *Attorney, Agent, or Firm* — Pillsbury Winthrop Shaw Pittman, LLP

(57) ABSTRACT

Some embodiments may obtain a natural language question, determine a context of the natural language question, and generate a first vector based on the natural language question using encoder neural network layers. Some embodiments may access a data table comprising column names, generate vectors based on the column names, and determine attention scores based on the vectors. Some embodiments may update the vectors based on the attention scores, generating a second vector based on the natural language question, determine a set of strings comprising a name of the column names and a database language operator based on the vectors. Some embodiments may determine a values based on the determined database language operator, the name, using a transformer neural network model. Some embodiments may generate a query based on the set of strings and the values.

16 Claims, 5 Drawing Sheets

Related U.S. Application Data continuation of application No. 17/877,365, filed on Jul. 29, 2022, now Pat. No. 11,520,815.

(60) Provisional application No. 63/227,790, filed on Jul. 30, 2021, provisional application No. 63/227,793, filed on Jul. 30, 2021, provisional application No. 63/227,796, filed on Jul. 30, 2021.

(51) Int. Cl.
| | | |
|---|---|---|
| *G06F 16/35* | (2019.01) | |
| *G06F 40/186* | (2020.01) | |
| *G06F 40/279* | (2020.01) | |
| *G06F 40/295* | (2020.01) | |
| *G06N 20/20* | (2019.01) | |
| *G06Q 50/18* | (2012.01) | |

(52) U.S. Cl.
CPC .......... *G06F 16/355* (2019.01); *G06F 40/186* (2020.01); *G06F 40/279* (2020.01); *G06F 40/295* (2020.01); *G06N 20/20* (2019.01); *G06Q 50/18* (2013.01)

(58) Field of Classification Search
CPC .... G06F 40/279; G06F 40/295; G06F 40/216; G06F 40/30; G06F 40/35; G06F 40/44
See application file for complete search history.

(56) References Cited

U.S. PATENT DOCUMENTS

| | | | |
|---|---|---|---|
| 10,558,759 | B1 | 2/2020 | Arfa et al. |
| 10,817,650 | B2 | 10/2020 | McCann et al. |
| 10,861,456 | B2 | 12/2020 | Tran et al. |
| 10,997,503 | B2 | 5/2021 | Dohan et al. |
| 11,113,479 | B2 | 9/2021 | Tran et al. |
| 11,138,248 | B2 | 10/2021 | Parameshwara et al. |
| 11,216,618 | B2 | 1/2022 | Feng et al. |
| 11,243,944 | B2 * | 2/2022 | Zhang ................. G06F 16/2237 |
| 11,288,295 | B2 | 3/2022 | Fan et al. |
| 11,423,068 | B2 | 8/2022 | Faruqui et al. |
| 11,431,660 | B1 | 8/2022 | Leeds et al. |
| 11,520,815 | B1 | 12/2022 | Gutta et al. |
| 11,544,590 | B2 * | 1/2023 | Kim ...................... G06F 18/253 |
| 11,580,150 | B1 | 2/2023 | Gutta et al. |
| 11,615,249 | B2 | 3/2023 | McCann et al. |
| 11,720,615 | B2 | 8/2023 | Gutta et al. |
| 11,860,916 | B2 | 1/2024 | Gutta et al. |
| 11,880,658 | B2 * | 1/2024 | Balasubramanian ... G06F 40/30 |
| 11,886,233 | B2 * | 1/2024 | Kim ...................... G06F 40/35 |
| 2006/0074900 | A1 | 4/2006 | Nanavati et al. |
| 2010/0223276 | A1 | 9/2010 | Al-Shameri et al. |
| 2011/0320498 | A1 | 12/2011 | Flor |
| 2014/0067368 | A1 | 3/2014 | Yih et al. |
| 2016/0041980 | A1 | 2/2016 | Mungi et al. |
| 2016/0203152 | A1 | 7/2016 | Burukhin et al. |
| 2016/0358094 | A1 | 12/2016 | Fan et al. |
| 2017/0061250 | A1 | 3/2017 | Gao et al. |
| 2018/0365201 | A1 | 12/2018 | Hunn et al. |
| 2019/0012373 | A1 | 1/2019 | Malik et al. |
| 2019/0034404 | A1 | 1/2019 | Anderson et al. |
| 2019/0130248 | A1 | 5/2019 | Zhong et al. |
| 2020/0042649 | A1 | 2/2020 | Bakis et al. |
| 2020/0250747 | A1 | 8/2020 | Padmanabhan |
| 2020/0293874 | A1 | 9/2020 | Ji et al. |
| 2020/0294133 | A1 | 9/2020 | Cella |
| 2020/0380624 | A1 | 12/2020 | Turgman et al. |
| 2021/0004540 | A1 | 1/2021 | Harper et al. |
| 2021/0004794 | A1 | 1/2021 | Kumar Kumaresan et al. |
| 2021/0034966 | A1 | 2/2021 | Qian |
| 2021/0056150 | A1 | 2/2021 | Karandish et al. |
| 2021/0065304 | A1 | 3/2021 | Greene et al. |
| 2021/0081503 | A1 * | 3/2021 | Tran ..................... G06F 18/22 |
| 2021/0109995 | A1 | 4/2021 | Mihindukulasooriya et al. |
| 2021/0256069 | A1 | 8/2021 | Grail et al. |
| 2021/0294970 | A1 | 9/2021 | Bender et al. |
| 2021/0295822 | A1 | 9/2021 | Tomkins et al. |
| 2021/0312302 | A1 | 10/2021 | Gaur et al. |
| 2021/0342847 | A1 | 11/2021 | Shachar et al. |
| 2021/0406225 | A1 | 12/2021 | Akhoury et al. |
| 2021/0406772 | A1 | 12/2021 | Shillingford et al. |
| 2022/0043972 | A1 * | 2/2022 | Nishida .................. G06F 40/20 |
| 2022/0086131 | A1 | 3/2022 | Kinai et al. |
| 2023/0034414 | A1 * | 2/2023 | Osugi .................. G06F 40/216 |
| 2023/0037077 | A1 | 2/2023 | Gutta et al. |
| 2023/0038529 | A1 | 2/2023 | Gutta et al. |
| 2023/0096857 | A1 | 3/2023 | Gutta et al. |
| 2023/0195767 | A1 | 6/2023 | Gutta et al. |
| 2023/0315770 | A1 | 10/2023 | Gutta |

OTHER PUBLICATIONS

"Bayes classifier," Wikipedia, https://en.wikipedia.org/w/index.php?title=Bayes_classifier&oldid=1094620681, Jun. 23, 2022, pp. 1-3.

Montantes, James, "BERT Transformers—How Do They Work?," Becoming Human: Artificial Intelligence Magazine, Apr. 12, 2021, pp. 1-20.

Sharma, Akshay, "Brief Introduction to N-gram and TF-IDF | Tokenization," Feb. 1, 2021, pp. 1-5.

"Deep learning vs. machine learning in Azure Machine Learning," Microsoft Docs, Apr. 2, 2022, https://docks.microsoft.com/en-us/azure/machine-learning/concept-deep-learning-vs-machine-learning, pp. 1-9.

"Extract N-Gram Features from Text component reference," Azure Machine Learning, Apr. 11, 2021, pp. 1-8.

"How to use CountVectorizer for n-gram analysis," Practical Data Science, Dec. 24, 2021, pp. 1-15.

"N-gram," Wikipedia, https://en.wikipedia.org/w/index.php?title=N-gram&oldid=1091994341, Jun. 7, 2022, pp. 1-10.

"N-Grams," DeepAI, https://deepai.org/machine-learning-glossary-and-terms/n-gram, Jul. 29, 2022, pp. 1-3.

Tf-idf, Wikipedia, https://en.wikipedia.org/w/index.php?title=Tf-idf&oldid=1098671947, Jul. 16, 2022, pp. 1-7.

Ibanez, Daniel, "Transformer Text Embeddings," https://www.baeldung.com/cs/transformer-text-embeddings, May 7, 2021, pp. 1-21.

Vector space model, Wikipedia, https://en.wikipedia.org/w/index.php?title=Vector_space_model&oldid=108409508, Apr. 22, 2022, pp. 1-5.

"Deep Learning," IBM Cloud Education, https://www.ibm.com/cloud/watson-studio/deep-learning, May 1, 2022, pp. 1-9.

Wang et al., "GLUE: A Multi-Task Benchmark and Analysis Platform for Natural Language Understanding", 2018, pp. 1-9.

Mik, Eliza, "Smart contracts: Terminology, technical limitations and real world complexity", Oct. 2017, Law, Innovation and Technology, pp. 1-26.

"Template", Free On-Line Dictionary of Computing, Oct. 14, 2007, foldoc.org, pp. 1-2.

Clack et al., "Smart Contract Templates: foundations, design landscape and research directions", Mar. 15, 2017, Barclays Bank, pp. 1-15.

Non-Final Office Action for U.S. Appl. No. 17/877,321, dated Oct. 13, 2022, pp. 1-24.

Non-Final Office Action for U.S. Appl. No. 17/877,264, dated Oct. 18, 2022, pp. 1-20.

Notice of Allowance in U.S. Appl. No. 17/877,365 dated Sep. 21, 2022, pp. 1-21.

Corrected Notice of Allowance in U.S. Appl. No. 17/877,365 dated Oct. 6, 2022, pp. 1-14.

Notice of Allowance in related U.S. Appl. No. 17/877,321 dated Dec. 14, 2022, pp. 1-16.

Corrected Notice of Allowability in related U.S. Appl. No. 17/877,321 dated Jan. 5, 2023, pp. 1-12.

Non-Final Office Action in related U.S. Appl. No. 18/073,815, dated Apr. 25, 2023, pp. 1-11.

Notice of Allowance in related U.S. Appl. No. 17/877,264, dated Jun. 1, 2023, pp. 1-10.

(56) References Cited

OTHER PUBLICATIONS

Final Office Action in related U.S. Appl. No. 17/877,264, dated Mar. 7, 2023, pp. 1-19.
Notice of Allowance in related U.S. Appl. No. 18/073,815, dated Jun. 27, 2023, pp. 1-10.
Notice of Allowance issued in U.S. Appl. No. 18/108,116, dated Jan. 24, 2024, pp. 1-9.
Notice of Allowance issued in U.S. Appl. No. 18/108,116, dated Mar. 5, 2024, pp. 1-13.

* cited by examiner

DATABASE QUERY GENERATION USING NATURAL LANGUAGE TEXT

RELATED APPLICATIONS

This application is a continuation of U.S. patent application Ser. No. 18/073,815, filed Dec. 2, 2022 and titled "DATABASE QUERY GENERATION USING NATURAL LANGUAGE TEXT", which is a continuation of U.S. patent application Ser. No. 17/877,365 filed Jul. 29, 2022 and titled "DATABASE QUERY GENERATION USING NATURAL LANGUAGE TEXT" (issued as U.S. Pat. No. 11,520,815 on Dec. 6, 2022), which claims benefit of U.S. Provisional Patent No. 63/227,790 filed Jul. 30, 2021 and titled "DATABASE QUERY GENERATION USING NATURAL LANGUAGE TEXT", U.S. Provisional Patent No. 63/227,793 filed Jul. 30, 2021 and titled "DATABASE GENERATION FROM NATURAL LANGUAGE TEXT DOCUMENTS", and U.S. Provisional Patent No. 63/227,796 filed Jul. 30, 2021 and titled "SELF-EXECUTING PROTOCOL GENERATION FROM NATURAL LANGUAGE TEXT", the entireties of which are each hereby incorporated by reference.

This application is related to co-pending U.S. patent application Ser. No. 18/108,116, filed Feb. 10, 2023 and titled "DATABASE GENERATION FROM NATURAL LANGUAGE TEXT DOCUMENTS", which is a continuation of U.S. patent application Ser. No. 17/877,321 titled "DATABASE GENERATION FROM NATURAL LANGUAGE TEXT DOCUMENTS" filed on Jul. 29, 2022, (issued as U.S. Pat. No. 11,580,150 on Feb. 14, 2023), and to co-pending U.S. patent application Ser. No. 18/331,655, filed Jun. 8, 2023, and titled "SELF-EXECUTING PROTOCOL GENERATION FROM NATURAL LANGUAGE TEXT", which is a continuation of U.S. patent application Ser. No. 17/877,264 titled "SELF-EXECUTING PROTOCOL GENERATION FROM NATURAL LANGUAGE TEXT" filed on Jul. 29, 2022 (issued as U.S. Pat. No. 11,720,615 on Aug. 8, 2023), the entireties of which are each hereby incorporated by reference.

BACKGROUND

Natural language processing includes techniques usable to query data systems and obtain values based on the queries. Applications often employ natural language processing techniques to perform document processing tasks such as translation, information extraction, summarization, text generation, or document assessment. Natural language processing often includes the training of a model for use in translating natural language text from one language or domain to another language or domain.

SUMMARY

The following is a non-exhaustive listing of some aspects of the present techniques. These and other aspects are described in the following disclosure.

Provided in some embodiments is a technique that includes processes and systems for generating a database language query based on a natural language query. In some embodiments, a database language query is generated based on a natural language question and a context of the natural language question. In certain embodiments, database feature names and questions are encoded into vectors of a vector space, and machine learning is employed to map the feature names and query filters to the questions. In some embodiments, query parameters are populated with 'primitive' types, such as quantitative data, categorical data, or Boolean data. In certain embodiments, various specific NLP models are used in a hierarchy. This may include, for example, using a bidirectional recurrent neural network model to determine features and then using a transformer neural network model to determine values for the query.

Provided in some embodiments is a tangible, non-transitory, machine-readable medium storing instructions that are executable by a data processing apparatus to cause a data processing apparatus to perform operations described herein, such as those described above.

Provided in some embodiments is a system, including one or more processors and memory storing instructions that are executable by a data processing apparatus to cause a data processing apparatus to perform operations described here, such as those described above.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
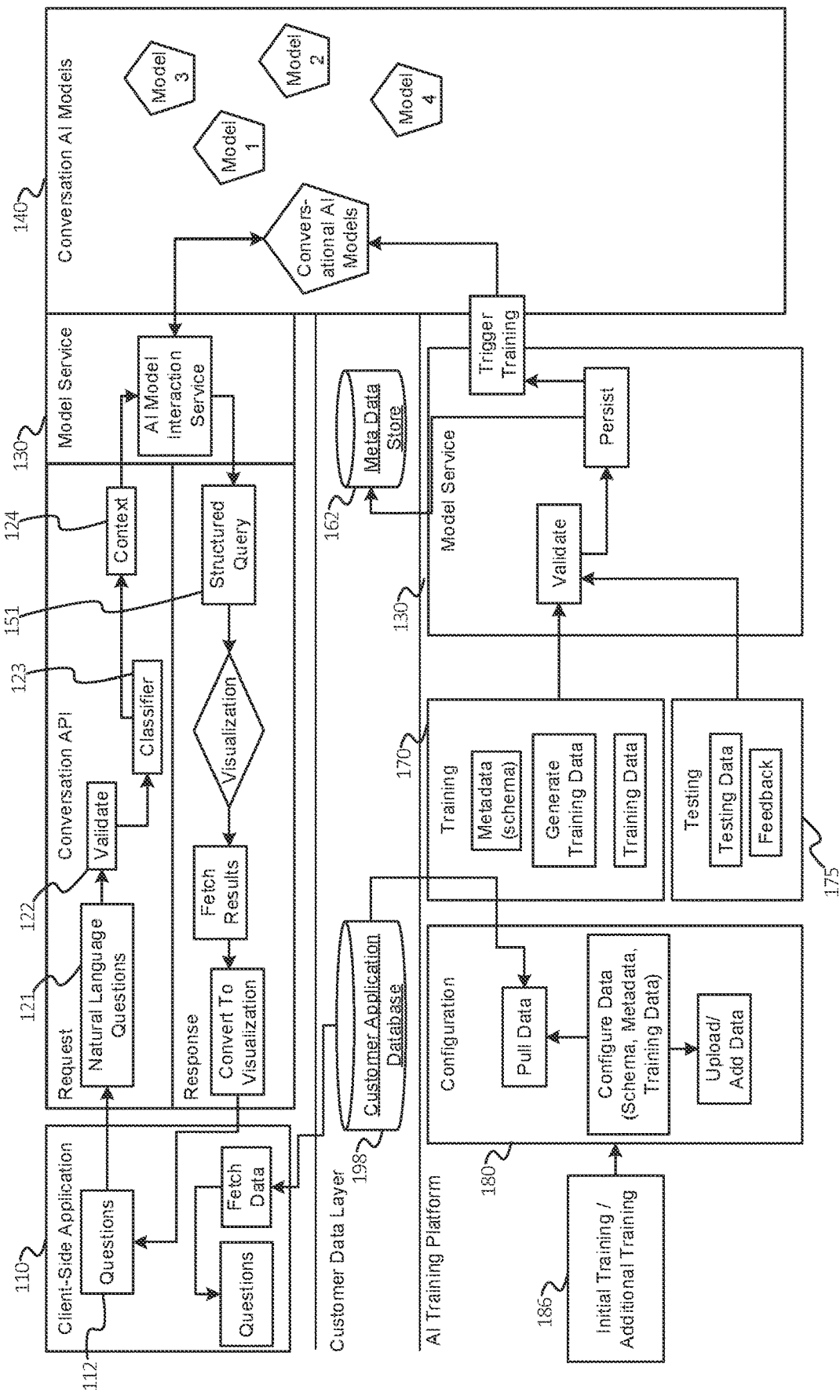
FIG. 1 is a diagram that illustrates a logic-and-physical-architecture system in accordance with one or more embodiments of the present technique.

While the present techniques are susceptible to various modifications and alternative forms, specific embodiments are shown by way of example in the drawings and are be described in detail. The drawings may not be to scale. The drawings and detailed description are not intended to limit the present techniques to the particular form described, but are intended to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of natural language processing. Indeed, the inventors wish to emphasize the difficulty of recognizing those problems that are nascent and will become much more apparent in the future should trends in industry continue as the inventors expect. Further, because multiple problems are addressed, some embodiments are problem-specific, and not all embodiments address every problem with traditional systems described herein or provide every benefit described herein. That said, improvements that solve various permutations of these problems are described below.

Database systems typically permit users to query data in one or more database query languages for a database system, such as SQL, graphQL, MongoDB, or the like. Using a database query language to generate a structured query often requires database language knowledge, subject matter knowledge, and an understanding of the architecture of the database system being queried. In many cases, these database systems grow increasingly complex over time as more and more data is ingested and organized for disparate applications. Unfortunately, queries that are expressed in a relatively simple natural language question can involve the execution of a complex query due to the complexities of the operators being implicitly described in the natural language question or the complexities of the database system being queried.

As described herein, certain embodiments may provide for obtaining a natural language question from a user and performing one or more operations to generate and execute a set of one or more corresponding database language queries. The embodiments may, for example, provide operations to query a database system using a natural language question, including query generation based on contexts of previous questions or other values.

Example Systems

FIG. 1 is a diagram that illustrates a logic-and-physical-architecture of a database system (or "system") 100 in accordance with one or more embodiments of the present technique. The system 100 may, for example, generate a database language query based on an obtained natural language question. Some embodiments may include employing the system 100 to obtain a first set of question 112 via a web message at an application program interface (API) endpoint, where the first set of questions may have been sent from a client-side application 110. The web message may include, for example, a hypertext transfer protocol (HTTP) web request, which may encode the set of questions 112 into a set of natural language questions 121 in the body of the HTTP web request. In some embodiments, the first question of the set of questions may have been an initial question. Alternatively, the first question may have been preceded by a set of previous natural language questions provided by the client-side application 110. Some embodiments may validate the set of natural language questions 121 using a validation system 122, wherein the validation system 122 may include a rules engine or other validation system. For example, some embodiments may validate a question by determining that the question includes at least one of a set of keywords or does not include at least one word of a set of excluded words.

In some embodiments, after obtaining the first question at the API endpoint, the system 100 performs one or more operations to use a trained artificial intelligence (AI) learning model (e.g., a deep learning model or other type of machine learning model) to generate a database language query. Machine learning models may be a type of AI learning models, and deep learning models may, for example, be a type of machine model that employs a neural network with multiple layers (which may include one or more hidden layers). Although certain embodiments are described as employing one or more deep learning models for the purpose of illustrations, certain embodiments may employ other suitable types of models, such as other AI and machine learning models. For example, the system 100 may classify a document using a document classifier 123, or may classify a question based on one or more n-grams of the question matching with a word of a list of words stored in a set of vocabulary records. Alternatively, or in addition, the document classifier 123 may include a deep learning model usable to assign a category or score to one or more questions of the set of natural language questions 121. In some embodiments a set of context parameters 124 is determined based on the set of previous questions.

In some embodiments, the system 100 fetches a set of machine learning model parameters from a data store 162 for one or more machine learning models (e.g., deep learning models) using, for example, a model service API of a model service 130. In some embodiments, some or all of the parameters of a set of model parameters used to generate a structured database language query are obtained via a transfer learning operation in conjunction with one or more training operations used to configure the set of model parameters. The data store 162 may include one or more data tables that have features with corresponding feature names (i.e., column names). Certain embodiments may include the system 100 performing a first set of machine learning operations to select or generate data tables of the data store 162. Alternatively, or in addition, some embodiments may include the system 100 performing a set of machine learning operations to select feature names of data tables for data table construction and using the constructed data tables or their corresponding features as inputs for the set of deep learning models 140.

In some embodiments, the system 100 uses a deep learning model of a set of deep learning models 140 to generate a database language query. As described herein, some embodiments may include the system 100 selecting models to use as a deep learning model for query generation based on the set of context parameters 124 or other variables. Once generated by the deep learning model, the system 100 may provide a structured query 151 to the client-side application 110, where visualization or searching operations may be performed based on the structured query 151. For example, the system 100 may use the structured query 151 to obtain data, submit a query to the customer application database 198 and visualize data provided by the customer application database 198.

In some embodiments, the system obtains a set of databases in conjunction with the natural language question. For example, some embodiments may include the system 100 presenting a user interface to a user that permits the user to select, via a drop-down menu or a set of checkboxes, one or more databases search conjunction with a natural language question. Alternatively, or in addition, some embodiments may include the system 100 determining a set of databases to be searched based on the natural language question or the context surrounding the natural language question. For example, some embodiments may include the system 100 generating a category or vector based on the natural language text session and selecting a set of databases to search based on the category or vector. Some embodiments may include the system 100 determining a question vector based on the obtained question. Some embodiments may further include the system 100 obtaining one or more previous question vectors corresponding with a set of previous natural language questions related to the obtained question.

In some embodiments, a database includes one or more records in conjunction with one or more features, where a feature is represented in the form of a table column, a set of properties, or other fields that are shared between different records of the database. For example, a database may include a first table arranged in a table schema, where records of the table schema or accessible via a primary key, a set of foreign keys, and may include one or more features. As described elsewhere in this disclosure, some embodiments may include performing a training operation to obtain the one or more features.

In some embodiments, the training module 170 and testing module 175 are used to train, test, or validate one or more deep learning models described in this disclosure, such as a long-short-term memory (LSTM) model, another recurrent neural network model having a plurality of neural network layers, a transformer neural network model, or the like. In some embodiments, a neural network includes a set of neural network layers. Each layer of the set of neural network layers may be stored as a set of values indicating one or more artificial neurons that include biases, weights, activation function parameters, and memory values forget-gate values, or the like. In some embodiments, operations are further configured using a configuration module 180. Additional training data 186 may be provided to the configuration module 180, and the additional training data 186 may include training questions or corresponding queries provided by users.

Figure 2:
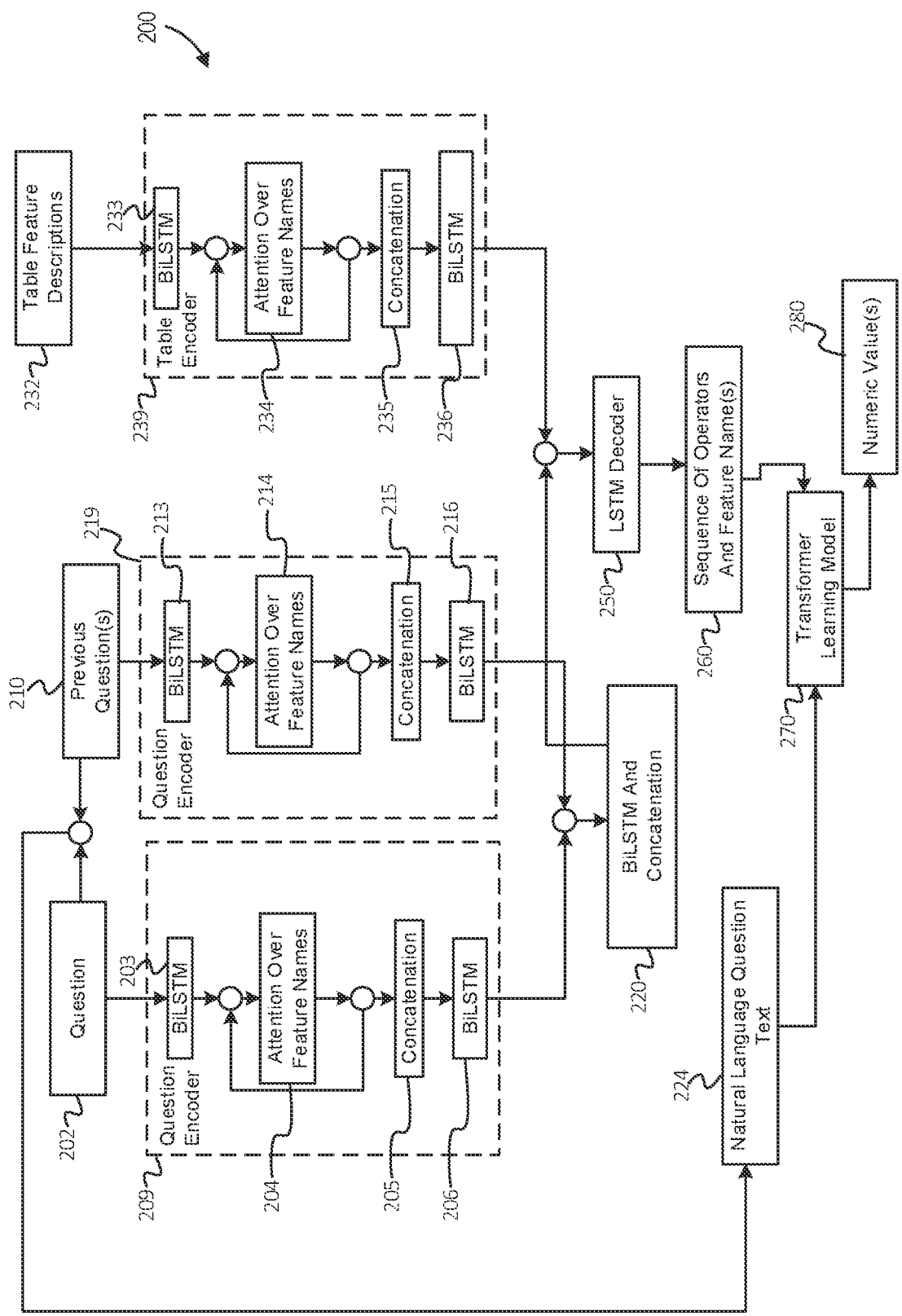
FIG. 2 is a diagram that illustrates a logical architecture diagram in accordance with one or more embodiments of the present technique.

FIG. 2 is a diagram that illustrates a logical architecture diagram 200 in accordance with one or more embodiments of the present technique. The logical architecture 200 may, for example, be employed to train and use a deep learning model to generate a database language query based on an obtained natural language question. In some embodiments, a natural language question 202 is provided to a first question encoder 209, where the question encoder 210 includes a first bidirectional LSTM model 203 used to generate a plurality of n-gram scores, where scores are a single value, a plurality of values (e.g., a vector), a set of categorical values, or the like. For example, the first bidirectional LSTM model 203 may generate a set of word vectors in a feature space based on the natural language question 202. In some embodiments, a set of attention vectors 204 over a set of specific features is then determined based on the output of the bidirectional LSTM model 203. In some embodiments, the set of attention vectors 204 are determined during a training operation. In some embodiments, a concatenation operation is then performed on the attention-weighted bidirectional LSTM output (as indicated by the concatenation function 205). In some embodiments, the concatenated output is provided to a second bidirectional LSTM model 206.

In some embodiments, a set of previous natural language questions 212 is provided to a second question encoder 219. The question encoder 219 may include, for example, a third bidirectional LSTM model 213 to generate a plurality of n-gram scores. For example, the third bidirectional LSTM model 213 may generate a set of word vectors in a feature space based on the set of previous natural language questions 212. A set of attention vectors 214 may then be determined over a set of specific features based on the output of the third bidirectional LSTM model 213. In some embodiments, the set of attention vectors 214 are determined during a training operation. A a concatenation operation may then be performed on the attention-weighted bidirectional LSTM output indicated by the concatenation function 215. In some embodiments, the concatenated output is provided to a fourth bidirectional LSTM model 216.

In some embodiments, table feature descriptions 232 are provided to a table encoder 239. The table encoder 239 may include, for example, a fifth bidirectional LSTM model 233 that is used to generate a plurality of n-gram scores. The fifth bidirectional LSTM model 233 may, for example, generate a set of word vectors in a feature space based on the table feature descriptions 232. A set of attention vectors 234 may then be determined over a set of specific features based on the output of the fifth bidirectional LSTM model 233. In some embodiments, the set of attention vectors 234 is determined during a training operation. A concatenation operation may then be performed on the attention-weighted bidirectional LSTM output as indicated by the concatenation function 235. In some embodiments, the concatenated output may then be provided to a sixth bidirectional LSTM model 236.

In some embodiments, the outputs of the first question encoder 209 and the second question encoder 219 may be combined, and the combined outputs may be used as an input for a third bidirectional LSTM model 220 to generate a set of concatenated vectors. A LSTM decoder 250 may then be used to determine a sequence of database language operators and a set of document feature names 260. The LSTM decoder 250 may include, for example, a plurality of decoder neural network layers and determine the sequence of operators based on the concatenated vectors produced by the LSTM model 220 and the table encoder 239. In some embodiments, the sequence of operators and a sequence of database language operators and a set of document feature names 260 in conjunction with the natural language question text 224 are provided to a transformer learning model 270 to determine a set of numeric values 280. In some embodiments, the set of numeric values 280 may be combined with the sequence of database language operators and a set of document feature names 260 to generate a database language query.

Example Database Query Operations

In some embodiments, a natural language processing (NLP) computer system, such as database system 100, conducts database query operations for generating and executing a database query based on a natural language question.

In some embodiments, the database query operations include determining, by the NLP computer system, a set of natural language questions associated with a given source of questions, where the set of natural language questions includes (a) a current natural language question (e.g., a question 202) associated with the source, and (b) a set of prior natural language questions (e.g., previous questions 210) including natural language questions associated with the source and submitted/received prior to submission/receipt of the first natural language question. For example, the set of natural language questions may include a current natural language question received from a person, computer or other entity, and (b) the set of prior natural language questions may include a set of one or more natural language questions received from the person, computer or other entity in the month preceding receipt of the first natural language question.

In some embodiments, the database query operations include determining, by a first question encoder (e.g., question encoder 209) of the database system using the first natural language question, a first question model output including question vectors. The first question encoder may, for example, employ one or more bidirectional long-short-term memory (BiLSTM) models. For example, the first question encoder may employ a $1^{st}$ BiLSTM model (e.g., as depicted at element 203) to generate a set of question vectors based on n-gram scores for n-grams in the first natural language question, where an attention operation is conducted (e.g., as depicted at element 204) on the set of question vectors to generate an attention weighted set of question vectors, where a concatenation operation is performed (e.g., as depicted at element 205) on the attention weighted set of question vectors to generate a concatenated set of question vectors, and where the first question encoder further employs a $2^{nd}$ BiLSTM model (e.g., as depicted at block 206) to generate, based on the concatenated set of question vectors, the question vectors.

In some embodiments, the database query operations include determining, by a second question encoder of the database system (e.g., question encoder 219) using one or more questions of the set of prior natural language questions, a second question model output including a context parameters. The second question encoder may, for example, employ one or more bidirectional long-short-term memory (BiLSTM) models. For example, the second question encoder may employ a $3^{rd}$ BiLSTM model (e.g., as depicted at element 213) to generate a set of feature vectors based on n-gram scores for n-grams in the set of prior natural language questions, where an attention operation is conducted (e.g., as depicted at element 214) on the set of feature vectors to generate an attention weighted set of feature vectors, where a concatenation operation is performed on the attention weighted set of feature vectors to generate a concatenated set of feature vectors, and where the second question encoder employs a $4^{th}$ BiLSTM model (e.g., as depicted at element 216) to generate, based on the concatenated set of feature vectors, context parameters including one or more vectors. The feature vectors may be, for example, a set of numbers that together represent the information to be passed to the deep learning algorithm.

In some embodiments, the database query operations include determining, by a BiLSTM model (e.g., question encoder 220) of the database system and based on the question vectors and the context parameters, a set of concatenated question vectors for the question vector and the context parameters. This may include, for example, determining, based on a combining of the question vector and the context parameters previously determined, a concatenated set of question-context vectors, and employing a $5^{th}$ BiLSTM model to generate, based on the concatenated set of question-context vectors, the set of concatenated question vectors.

In some embodiments, the database query operations include determining, by the database system, a selected database corresponding to the first natural language question. The selected database may include a data table having feature descriptions (e.g., table feature descriptions 232) defining features names and feature values. In some embodiments, determining a selected database corresponding to the first natural language question includes (a) receiving user selection of the selected database, or (b) (i) determining a context including a current question vector for the natural language question or a feature vector for the set of prior natural language questions, and (ii) determining, based on the context, the selected database.

In some embodiments, the database query operations include determining, by a table encoder (e.g., encoder 239) of the database system using the features of the data table of the selected database, a table encoder model output including word vectors. The table encoder may employ, for example, a BiLSTM model to generate the table encoder model output. For example, the table encoder may employ a $6^{th}$ BiLSTM model (e.g., as depicted at element 233) to generate a set of table feature word vectors based on n-gram scores for n-grams in the features of the data table of the selected database, where an attention operation is conducted (e.g., as depicted at element 234) on the set of table feature word vectors to generate an attention weighted set of table feature word vectors, where a concatenation operation is performed (e.g., as depicted at element 235) on the attention weighted set of table feature word vectors to generate a concatenated set of table word vectors, and where the second question encoder employs a $7^{th}$ BiLSTM model (e.g., as depicted at element 236) to generate, based on the set of table word vectors, the word vectors.

In some embodiments, the database query operations include (7) determining, by a decoder (e.g., LSTM decoder 250) of the database system and based on the concatenated question vectors and the word vectors, a set of strings including a feature name of the feature names of the data table and a database language operator. The feature name may be, for example, "age" and the operator may be, for example, a numerical operator (e.g., "greater than" or ">"). Here name may refer to the column name of the table, and operator may refer to a condition to be added in the query. These may, for example, be determined from the context taken from the question. For example, for the question "what is the name of person with age greater than 80?", 'age' and 'greater' may be determined from the context of the question using a deep learning algorithm.

In some embodiments, the database query operations include (8) determining, by a transformer neural network model (e.g., transformer learning model 270) of the database system and based on the set of strings and the database language operator, a set of values (e.g., numerical values 280). Continuing with the prior example, the set of values may include, for example, the numeric value "55".

In some embodiments, the database query operations include (9) generating, by the database system based on the set of strings and the set of values, a database language query (e.g., structured query 151) for accessing data stored in a database (e.g., database 198). Continuing with the prior example, the database language query may be "select * from employees where age >55").

In some embodiments, the database query operations include (10) executing, by the database system, the database language query to retrieve a corresponding set of data from a datastore of the database. Continuing with the prior example, the database language query "select * from employees where age >55" may be executed to retrieve from a database storing employee records (e.g., database 198), a listing of employees over the age of 55. The listing may, for example, be provided to a client-side application (e.g., application 110) executing on a client device. The client-side application may, for example, cause the client device (or another device) to display the listing (e.g., on a graphical user interface (GUI)) of the client computing device or another computing device), may process the listing, provide the data to other applications for use in further processing, store the listing in a memory (e.g., in a local memory of the client device) or the like. Thus, a structured database query may be generated and executed in response to receipt of a corresponding natural language question.

Example Flowcharts

The processes presented in this disclosure are intended to be illustrative and non-limiting. In some embodiments, for example, the methods may be accomplished with one or more additional operations not described or without one or more of the operations discussed. Additionally, the order in which the processing operations of the methods are illustrated (and described below) is not intended to be limiting. In some embodiments, the methods may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the methods in response to instructions stored electronically on an electronic storage medium. The processing devices may include one or more devices configured through hardware, firmware, or software to be specifically designed for the execution of one or more of the operations of the methods.

In some embodiments, a computing environment may execute one or more routines described in this disclosure. In some embodiments, the various operations of the processes 300 or 400 may be executed in a different order, operations may be omitted, operations may be replicated, additional operations may be included, some operations may be performed concurrently, some operations may be performed sequentially, and multiple instances of the processes 300 or 400 may be executed concurrently, none of which is to suggest that any other description herein is limited to the arrangement described. In some embodiments, the operations of the processes 300 and 400 may be effectuated by executing program code stored in one or more instances of a machine-readable non-transitory medium, which in some cases may include storing different subsets of the instructions on different physical embodiments of the medium and executing those different subsets with different processors, an arrangement that is consistent with the use of the singular term "medium" herein.

Figure 3:
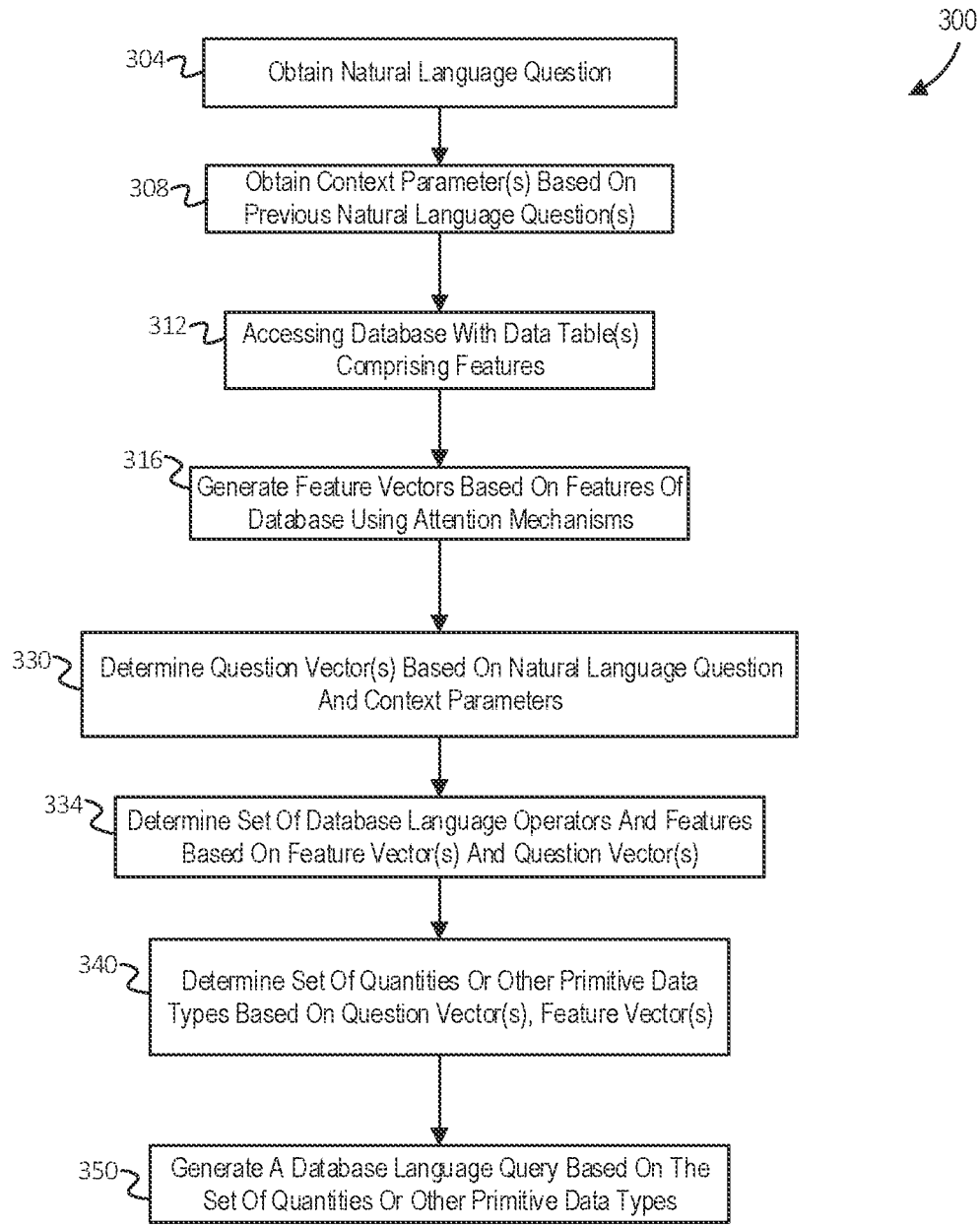
FIG. 3 is a flowchart diagram that illustrates method operations for generating and executing a database language query based on a natural language question in accordance with one or more embodiments of the present technique.

FIG. 3 is a flowchart diagram that illustrates method operations for generating and executing a database language query based on a natural language question in accordance with one or more embodiments of the present technique. FIG. 3 is a flowchart diagram that illustrates a method 300 (or "process") for generating and executing a database language query based on a natural language question in accordance with one or more embodiments of the present technique. The process may include using a deep learning model to execute a database language query based on a natural language question. In some embodiments, operations of the process 300 may begin at operations described for block 304. In some embodiments, operations of the process 300 may include obtaining a natural language question, as indicated for block 304. The natural language question may be provided via a search bar on a screen of a website, web app, native application, or the like. In some embodiments, a web message including the natural language question may be sent to a first API of a service or hosted application. As described elsewhere, one or more operations may be performed to validate the question based on one or more question validation criteria, such as a first criterion indicating that the question is in a known language, a criterion indicating that at least one word of the question matches a known vocabulary word, or the like. After obtaining the natural language question, some embodiments may determine a set of embedding vectors for n-grams of the natural language vector using a neural network of a deep learning model. For example, some embodiments may determine a sequence of embedding vectors having ten vectors based on the ten-word natural language question, "what is the average icon life in the icon library."

The natural language question may be provided in one or more languages, such as English, French, Mandarin, Russian, or the like. In some embodiments, the natural language question may be sent from a client computing device to be received by a server executing program code to perform one or more operations described in this disclosure. The natural language question may include words, numbers, names, symbols, hyperlinks, or the like. For example, the natural language question may include the question "how many people are in district 73 who have a risk score greater than five?"

In some embodiments, operations of the process 300 may include obtaining a set of context parameters based on a set of previous natural language questions, as indicated for block 308. In some embodiments, a natural language question may be one of a series of natural language questions provided by a user or otherwise sharing one or more properties. For example, a set of previous natural language questions may have been from a user account record that is indicated to have sent the most recent natural language question. Alternatively, or in addition, the set of previous natural language questions may have been sent from a same organization.

In some embodiments, operations of the process 300 may include accessing a database with a set of data tables comprising a set of features, as indicated for block 312. Accessing a database may include accessing the database via an API of the database, where some embodiments may retrieve values such as a set of feature names from one or more data tables of the database. In some embodiments, visualization of the data table may show each feature having a feature name and a plurality of feature values, wherein each feature value is a value of a different row or record the data table. Some embodiments may select a database or a set of data tables of a database to access based on the n-grams of the natural language question. For example, some embodiments may then select a database from a plurality of databases and a set of data tables of the first database based on the occurrence of the phrase "patient database." Alternatively, or in addition, some embodiments may select a database or set of data tables based on one or more values selected by a user via a UI element.

In some embodiments, operations of the process 300 may include generating a set of feature vectors based on the features of the database using a set of attention mechanisms, as indicated for block 320. Some embodiments may access a set of features of an obtained data table and use a deep learning model to generate a corresponding set of feature vectors for the features. In some embodiments, the feature vectors may be encoded to be in a same feature space as the feature space used to encode n-grams of the natural language question. For example, some embodiments may use a first deep learning model to encode a first version of the word "interface" in a natural language question into a first embedding vector "<125, 64, 247, 59, 11, 06>" and use a second deep learning model to encode a second version of the word "interface" of a table feature of a data table to determine a second embedding vector "<125, 64, 247, 59, 11, 06>," where the respective model parameters of the first and second deep learning models may be the same or different from each other.

In some embodiments, operations of the process 300 may include determining a question vector based on the natural language question and the context parameters, as indicated for block 330. Some embodiments may determine a question vector based on n-grams of a natural language question. For example, some embodiments may determine a question vector for a natural language question based on an initial set of embedding vectors assigned to n-grams of the natural language question, a set of bidirectional LSTM model parameters, and a set of attention values, as described elsewhere in this disclosure.

In some embodiments, operation the process 300 may include determining a set of database language operators based on the set of feature vectors and the set of question vectors, as indicated for block 334. In some embodiments, attention values may be used to indicate different n-grams of a natural language question to determine which n-grams to consider when generating the database language query. For example, some embodiments may provide an LSTM decoder neural network with a first input and second input. In some embodiments, the first input may be a concatenated output of a hidden state of a bidirectional LSTM deep learning model that received a natural language question as an input. The second input may include the set of feature values or another encoded set of vectors generated based on the features of an obtained data table described above. Some embodiments may generate a query structure that includes database language operators such as "SELECT" or "WHERE" based on the pair of inputs. For example, some embodiments may generate the query template "select * from employees where age >'#VAL1'," where the "#VAL1" may indicate a value position that will be populated at a later stage of a set of query generation operations. Furthermore, some embodiments may select a set of model parameters from a plurality of sets of model parameters based on the text of a natural language question or a corresponding set of embedding vectors. Some embodiments may select the set of model parameters directly. Alternatively, or in addition, some embodiment may select model parameters by providing a selection value to an API.

In some embodiments, operations of the process 300 may include determining a set of quantities or other primitive data types based on the set of question vectors, set of feature vectors, or set of database language operators, as indicated for block 340. Some embodiments may determine a set of quantities or other values for one or more primitive data types using a second deep learning model after using a first deep learning model to determine question vectors, features, or the like. For example, after using a first bidirectional LSTM model to determine a set of features, some embodiments may determine a corresponding set of values for the set of features using a transformer neural network model, such as a bidirectional encoder representation (BERT) model.

In some embodiments, operations the process 300 may include generating a database language query based on the set of quantities or other primitive data types, as indicated for block 350. Some embodiments may perform one or more abstractive summarization operations. For example, some embodiments may combine the query template comprising the set of query operators with the set of quantities or other primitive data types determined elsewhere in this disclosure. Some embodiments may perform operations to predict a likelihood of a determined quantity corresponding with a value that should be populated in the query template. Some embodiments may then send the generated database language query to a corresponding database. Furthermore, once a set of values are provided from a database is provided in response to a generated database query, some embodiments may visualize the set of values in the form of graphs, charts, or the like.

Figure 4:
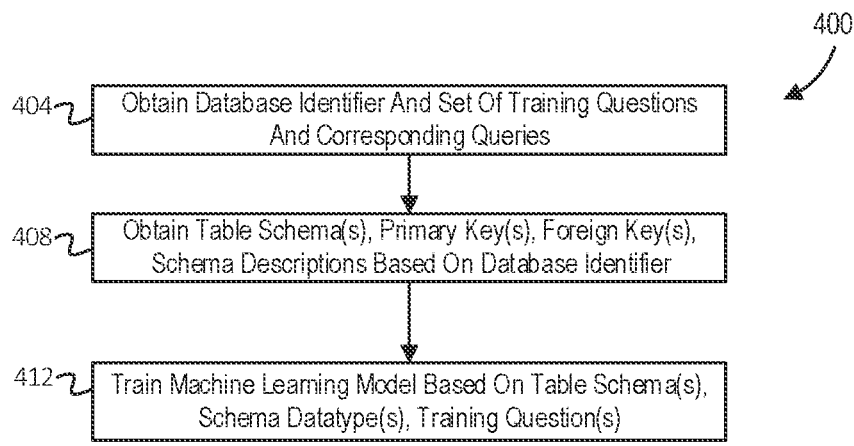
FIG. 4 is a flowchart diagram that illustrates method operations to train a machine learning model to generate a database language query based on a natural language question in accordance with one or more embodiments of the present technique.

FIG. 4 is a flowchart diagram that illustrates a method (or "process') 400 for training a deep learning model to generate a database language query based on a natural language question, in accordance with some embodiments of this disclosure. In some embodiments, operations of the process 400 may begin at operations described for block 404. In some embodiments, operations of the process 400 include obtaining a database identifier and a set of training questions and corresponding queries, as indicated for block 404. In some embodiments, the set of training questions and queries may be obtained from a local datastore of a server, such as a Redis database stored on a same server that is hosts an application executing an API that received the natural language question from a client computing device via a web message. Alternatively, or in addition, the set of training questions and queries may be obtained from a data store service.

In some embodiments, the set of training questions and queries may be obtained from a user-updated dataset. For example, some embodiments may obtain a plurality of training questions and corresponding queries that is provided by a plurality of users, where one or more scores associated with users may be increased or decreased based on the number of training questions corresponding queries provided by the user. For example, some embodiments may provide a first training question "how many analysts are in region 124" and a corresponding training query "SELECT analyst FROM employee_table WHERE location='region 124'." Alternatively, or in addition, some embodiments may receive a natural language question from a user and provide one or more corresponding database language queries. Some embodiments may provide a UI element to a user to indicate which of the generated queries is most accurate with respect to the natural language question and use the feedback provided by the user to train further the deep learning model(s) based on the user feedback. Furthermore, some embodiments may retrieve training queries based on a set of logs. For example, some embodiments may obtain training queries using a set of SQL server transaction log or other database transaction logs stored on a server.

In some embodiments, operations of the process 400 includes obtaining a set of table schemas, primary keys, foreign keys or schema descriptions from a database based on the database identifier, as indicated for block 408. As described elsewhere in this disclosure, some embodiments may determine a set of table schemas, primary keys, foreign keys, or schema descriptions to determine what data to obtain from a database. In some embodiments, the table schemas, corresponding keys, or corresponding descriptions may be identified by the database identifier. Alternatively, or in addition, some embodiments may select one or more table schemas, descriptions, or keys based on a text in the set of training questions.

In some embodiments, operations of the process 400 includes training a deep learning model based on the set of table schemas, schema datatypes, and training questions, as indicated for block 412. Some embodiments may execute a set of program instructions to directly train a deep learning model having model parameters stored on a same server that received the natural language question from the API. Alternatively, or in addition, some embodiments may send the set of table schemas, schema datatypes, and training questions to a training API to determine one or more deep learning model parameters. Furthermore, as described elsewhere in this disclosure, different deep learning models may be used in a hierarchical manner. For example, a first set of deep learning model parameters for a first deep learning model may be determined during a first training operation.

In some embodiments, operations of the process 400 may include sending one or more outputs of the trained deep learning model to a model services API to perform additional deep learning model training, as indicated for block 420. As described elsewhere in this disclosure, one or more deep learning models may be trained. For example, some embodiments may update a first deep learning model that is based on a set of LSTM models and train a second deep learning model that is based on a set of transformer neural network models.

Example Computing Device

Figure 5:
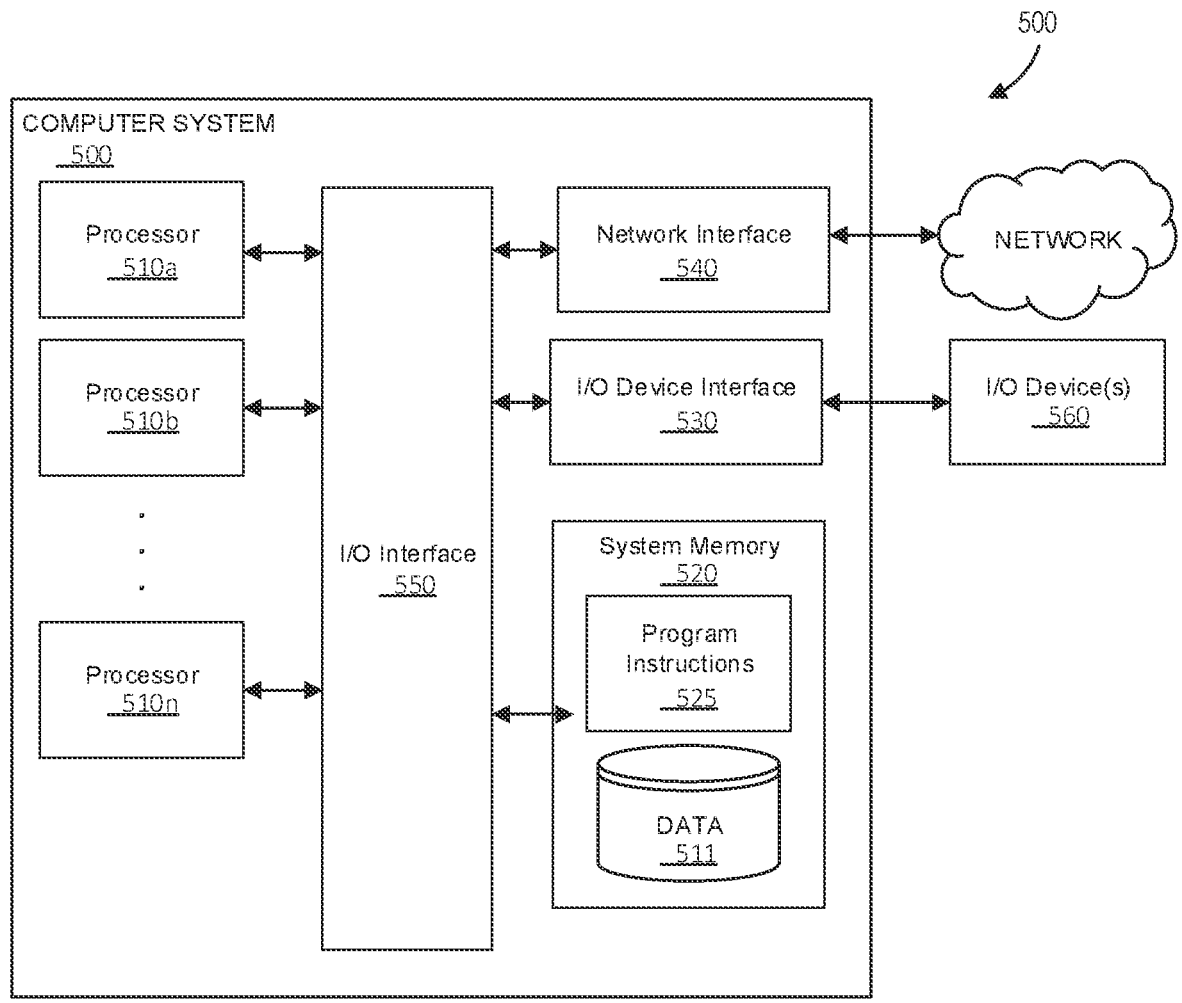
FIG. 5 shows an example of a computing device by which the present techniques may be implemented in accordance with one or more embodiments of the present technique.

FIG. 5 is a diagram that illustrates an example computing device 500 in accordance with one or more embodiments of the present technique. Various portions of systems and methods described herein, may include or be executed on one or more computer systems similar to computer system 500. Further, processes and modules described may be executed by one or more processing systems similar to that of computer system 500.

Computer system 500 may include one or more processors (e.g., processors 510a-510n) coupled to System memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may include one or more microcontrollers. A processor may receive instructions and data from a memory (e.g., System memory 520). Computer system 500 may be a uni-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer system, for example, may be connected to computer system 500 via a network and network interface 540.

Network interface 540 may include a network adapter that provides for connection of computer system 500 to a network. Network interface 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 524 or data 511. Program instructions 524 may be executable by a processor (e.g., one or more of processors 510a-510n) to implement one or more embodiments of the present techniques. Program instructions 524 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory, computer-readable storage medium. A non-transitory, computer-readable storage medium may include a machine readable storage device, a machine readable storage substrate, a memory device, or any combination thereof. Non-transitory, computer-readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 520 may include a non-transitory, computer-readable storage medium that may have program instructions stored thereon that are executable by a computer processor (e.g., one or more of processors 510a-510n) to cause the subject matter and the functional operations described herein. A memory (e.g., System memory 520) may include a single memory device and/or a plurality of memory devices (e.g., distributed memory devices). Instructions or other program code to provide the functionality described herein (such as the functions of the system 100) may be stored on a tangible, non-transitory, computer-readable media. The instructions may be executable by a computer processor to cause the associated operations to be performed. In some cases, the entire set of instructions may be stored concurrently on the media, or in some cases, different parts of the instructions may be stored on the same media at different times.

I/O interface 550 may be configured to coordinate I/O traffic between processors 510a-510n, System memory 520, network interface 540, I/O devices 560, and/or other peripheral devices. I/O interface 550 may perform protocol, timing, or other data transformations to convert data signals from one component (e.g., System memory 520) into a format suitable for use by another component (e.g., processors 510*a*-510*n*). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a GPS device, or the like. Computer system 500 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must).

The word "set" when used as a noun include a single item or a plurality of items, such that the phrase "set of items" may refer to either a single item or multiple items. The words "include", "including", and "includes" and the like mean including, but not limited to. As used throughout this application, the singular forms "a," "an," and "the" include plural referents unless the content explicitly indicates otherwise. Thus, for example, reference to "an element" or "an element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

Some embodiments may include text navigation indicators or other context values to indicate where one or more document type values is located in a document or verify the validity of an obtained document type value. For example, some embodiments may use a document classifier to determine that a first document has a document type of "Type01A" and a corresponding document feature of "effective date." The value for the document feature "effective date" may be stored in a first text section having the header "date listing." Some embodiments may perform one or more operations described in this disclosure on the first text section to retrieve a corresponding document feature value for the document feature "effective date" from the first text section using a Siamese BERT model. As described elsewhere in this disclosure, the relative sparsity of contract data may make dual input learning models such as the Siamese BERT model useful.

Some embodiments may apply a hierarchical set of deep learning models to obtain document feature values or other values of a document based on their corresponding types of values. For example, after using a first deep learning model to obtain a first set of document feature values, some embodiments may use a second machine learning model to obtain a second set of document feature values. The first set of document feature values may be a set of quantities, and the second set of document feature values may be a set of strings. Furthermore, some embodiments may obtain a set of pre-trained deep learning models using transfer learning techniques, where the set of pre-trained deep learning models may be further updated based on new feedback indicating whether one or more predicted values is correct.

As described elsewhere in this disclosure, some embodiments may use learning model parameters that are cached on a local computing device to perform one or more data extraction operations. For example, some embodiments may push a set of learning model parameters to a user computing device and then, after receiving a request to perform a data extraction operation, some embodiments may instruct the user computing device to extract data from a document based on the set of learning model parameters. Alternatively, or in addition, some embodiments may use learning model parameters that are stored in a fast cache, where the speed of data access with respect to the cash may be greater relative to a speed of data access for a persistent storage used to store documents. For example, some embodiments may obtain model parameters from a Redis datastore.

In some embodiments, operations of the process 400 may include determining whether a set of criteria is satisfied based on the set of document type values, as indicated for block 420. In some embodiments, one or more rules may be used to verify or otherwise validate field values obtained from a document. For example, some embodiments may apply a first set of rules associated with a first document type to a set of obtained field values, where the first set of rules. Some embodiments may apply a plurality of rules based on a document type category. For example, based on a determination that a document has a document type category of "transaction contract," some embodiments may apply a set of rules to check whether a corresponding set of obtained document feature values includes values that populate a first field titled "supplier," a second field titled "payment," or other fields of a corresponding set of document features. Various other rules may be applied, such as a rule that a set of compliance checks are satisfied, a set of conditions indicating non-suspicious activity is satisfied.

In some embodiments, different sets of criteria may be applied. For example, a first set of criteria may include a set of criteria indicating data quality, where criteria may include determining whether a first set of fields titled "required" has been populated with an associated set of field values or whether a set of derived field values have been determined. The set of criteria may also include determining whether the set of field values is cross-validated with other data, whether a set of ranges associated with one or more fields satisfy a corresponding range threshold, whether the source of the document being analyzed is listed as an accepted data source, or the like. A second set of rules may include a set of compliance rules corresponding with an account record or a group of account records identifying or otherwise associated with an organization. For example, the second set of rules may determine whether the field values indicate duplicate payment or invoices, duplicate purchase numbers for a same item, or the like. In some embodiments the set of rules being applied to a document may be specific to a document type, where a determination may be made about whether a document is actually of the document type (e.g., a document is identified by a set of headers or vocabulary as a contract), whether a document identifier is correct, whether a set of document feature values is present or within a range of known acceptable values, or the like. For example, some embodiments may determine whether a document has features associated with a document type "contract," whether the document has a correct identifier, whether the document lists either no discount or an incorrect discount value, or the like. Some embodiments may further determine reconciliation rules, where the reconciliation rules may include determining mismatches in quantity, price, or other numeric values.

Certain embodiments include a method that includes: obtaining a first natural language question; determining, based on a previous natural language query, a context of the first natural language question; generating a first vector based on the first natural language question using a first set of neural network layers; accessing a data table including a plurality of feature names; generating a first set of vectors based on the plurality of feature names; determining attention scores based on the first set of vectors; updating the first set of vectors based on the attention scores; generating a second vector based on the first set of vectors using a second set of neural network layers; determining a set of strings including a first name of the plurality of feature names and a database language operator based on the first set of vectors, the first vector, and the second vector using a third set of neural network layers of a long-short-term memory (LSTM) decoder model; and determining a set of values using a transformer neural network model based on the database language operator and the set of strings, wherein the set of values including a numeric value; and generating a database language query based on the set of strings and the set of values. In some embodiments, the method may further include executing the database language query to retrieve a corresponding set of data from a database. In some embodiments, the first natural language question and the previous natural language question are received from a given source. In some embodiments, the first set of vectors are generated by a bidirectional long-short-term memory (BiLSTM) model based on the plurality of feature names, and wherein the second set of vectors are generated by a bidirectional long-short-term memory (BiLSTM) model based on the first set of vectors updated based on the attention scores.

What is claimed is:

1. A method of querying a computer database system, the method comprising:
determining, by a database system, a set of natural language questions associated with a given source of questions, the set of natural language questions comprising:
a current natural language question associated with the source; and
a set of prior natural language questions comprising natural language questions associated with the source and submitted prior to submission of the current natural language question;
determining, by a first question encoder of the database system, and based on the current natural language question, a first question model output comprising question vectors, the first question encoder employing a first bidirectional long-short-term memory (BiLSTM) model to generate a set of question vectors based on n-gram scores for n-grams in the current natural language question, an attention operation is conducted on the set of question vectors to generate an attention weighted set of question vectors, a concatenation operation is performed on the attention weighted set of question vectors to generate a concatenated set of question vectors, and the first question encoder employs a second BiLSTM model to generate, based on the concatenated set of question vectors, the question vectors;
determining, by a second question encoder of the database system and based on one or more questions of the set of prior natural language questions, a second question model output comprising context parameters;

determining, by a third question encoder of the database system and based on the question vectors and the context parameters, a set of concatenated question vectors for the question vector and the context parameters;

determining, by the database system, a selected database corresponding to the current natural language question, the selected database comprising features having features names and feature values;

determining, by a table encoder of the database system and based on the features of the selected database, a table encoder model output comprising word vectors;

determining, by decoder of the database system and based on the set of concatenated question vectors and the word vectors, a set of strings comprising a feature name of the feature names of the data table and a database language operator;

determining, by a transformer model of the database system and based on the set of strings and the database language operator, a set of values;

generating, by the database system based on the set of strings and the set of values, a database language query for accessing data stored in a database; and executing, by the database system, the database language query to retrieve, from a datastore, a set of data corresponding to the database language query, presenting the set of data retrieved to a user in response to the execution of the database language query.

2. The method of claim 1, wherein the source is a given entity, the current natural language question is a natural language question query received from entity, and the set of prior natural language questions comprise a set of one or more natural language questions received from the entity in a given period of time preceding receipt of the current natural language question.

3. The method of claim 1, wherein the third question encoder employs a bidirectional long-short-term memory (BiLSTM) model to determine the set of concatenated question vectors.

4. The method of claim 3, wherein determining the set of concatenated question vectors comprises:

determining, based on the question vectors and the context parameters, a concatenated set of question context vectors; and determining, based on the application of the concatenated set of question context vectors to the BiLSTM model of the third question encoder, the set of concatenated question vectors.

5. The method of claim 1, wherein the second question encoder employs a BiLSTM model to determine the second question model output, the third question encoder employs a BiLSTM model to determine the set of concatenated question vectors, and the table encoder employs a BiLSTM model to determine table encoder model output.

6. The method of claim 1, wherein the second question encoder employs a first bidirectional long-short-term memory (BiLSTM) model to generate a set of feature vectors based on n-gram scores for n-grams in the set of prior natural language questions, wherein an attention operation is conducted on the set of feature vectors to generate an attention weighted set of feature vectors, wherein a concatenation operation is performed on the attention weighted set of feature vectors to generate a concatenated set of feature vectors, and the second question encoder employs a second BiLSTM model to generate, based on the concatenated set of feature vectors, context parameters comprising one or more vectors.

7. The method of claim 1, wherein the table encoder employs a first bidirectional long-short-term memory (BiLSTM) model to generate a set of table feature word vectors based on n-gram scores for n-grams in the features of the data table of the selected database, wherein an attention operation is conducted on the set of table feature word vectors to generate an attention weighted set of table feature word vectors, wherein a concatenation operation is performed on the attention weighted set of table feature word vectors to generate a concatenated set of table word vectors, and the second question encoder employs a second BiLSTM model to generate, based on the set of table word vectors, the word vectors.

8. The method of claim 1, wherein the first question encoder employs a first bidirectional long-short-term memory (BiLSTM) model to generate a first set of question vectors based on n-gram scores for n-grams in the current natural language question, wherein a first attention operation is conducted on the first set of question vectors to generate a first attention weighted set of question vectors, wherein a concatenation operation is performed on the first attention weighted set of question vectors to generate a first concatenated set of question vectors, and the first question encoder employs a second BiLSTM model to generate, based on the concatenated set of question vectors, the question vectors, and wherein the second question encoder employs a third BiLSTM model to generate a second set of feature vectors based on n-gram scores for n-grams in the set of prior natural language questions, wherein an attention operation is conducted on the second set of feature vectors to generate a second attention weighted set of feature vectors, wherein a concatenation operation is performed on the second attention weighted set of feature vectors to generate a second concatenated set of feature vectors, and the second question encoder employs a fourth BiLSTM model to generate, based on the second concatenated set of feature vectors, context parameters comprising one or more vectors.

9. The method of claim 8, wherein the table encoder employs a fifth BiLSTM model to generate a third set of table feature word vectors based on n-gram scores for n-grams in the features of the data table of the selected database, wherein an attention operation is conducted on the third set of table feature word vectors to generate a third attention weighted set of table feature word vectors, wherein a concatenation operation is performed on the third attention weighted set of table feature word vectors to generate a third concatenated set of table word vectors, and the second question encoder employs a sixth BiLSTM model to generate, based on the set of table word vectors, the word vectors.

10. The method of claim 1, wherein:

the decoder employs a long-short-term memory (LSTM) decoder to determine the set of strings, and the transformer model employs a transformer neural network model to determine the set of values.

11. The method of claim 1, wherein determining a selected database corresponding to the current natural language question comprises receiving user selection of the selected database.

12. The method of claim 1, wherein determining a selected database corresponding to the current natural language question comprises (a) determining a context comprising (i) a current question vector for the natural language question or (ii) a question vector for the set of prior natural language questions, and (b) determining, based on the context, the selected database.

13. A computer database system comprising:
a computer processor; and
non-transitory computer readable storage medium comprising program instructions stored thereon that are executable by the computer processor to cause the following operations:
determining, by a database system, a set of natural language questions associated with a given source of questions, the set of natural language questions comprising:
a current natural language question associated with the source; and
a set of prior natural language questions comprising natural language questions associated with the source and submitted prior to submission of the current natural language question;
determining, by a first question encoder of the database system, and based on the current natural language question, a first question model output comprising question vectors, the first question encoder employing a first bidirectional long-short-term memory (BiLSTM) model to generate a set of question vectors based on n-gram scores for n-grams in the current natural language question, an attention operation is conducted on the set of question vectors to generate an attention weighted set of question vectors, a concatenation operation is performed on the attention weighted set of question vectors to generate a concatenated set of question vectors, and the first question encoder employs a second BiLSTM model to generate, based on the concatenated set of question vectors, the question vectors;
determining, by a second question encoder of the database system and based on one or more questions of the set of prior natural language questions, a second question model output comprising context parameters;
determining, by a third question encoder of the database system and based on the question vectors and the context parameters, a set of concatenated question vectors for the question vector and the context parameters;
determining, by the database system, a selected database corresponding to the current natural language question, the selected database comprising features having features names and feature values;
determining, by a table encoder of the database system and based on the features of the selected database, a table encoder model output comprising word vectors;
determining, by decoder of the database system and based on the set of concatenated question vectors and the word vectors, a set of strings comprising a feature name of the feature names of the data table and a database language operator;
determining, by a transformer model of the database system and based on the set of strings and the database language operator, a set of values;
generating, by the database system based on the set of strings and the set of values, a database language query for accessing data stored in a database; and executing, by the database system, the database language query to retrieve, from a datastore, a set of data corresponding to the database language query, wherein the set of data retrieved is configured to be presented to a user in response to the execution of the database language query.

14. The system of claim 13, wherein the second question encoder employs a BiLSTM model to determine the second question model output, the third question encoder employs a BiLSTM model to determine the set of concatenated question vectors, and the table encoder employs a BiLSTM model to determine table encoder model output.

15. A non-transitory computer readable storage medium comprising program instructions stored thereon that are executable by the computer processor to cause the following operations:
determining, by a database system, a set of natural language questions associated with a given source of questions, the set of natural language questions comprising:
a current natural language question associated with the source; and
a set of prior natural language questions comprising natural language questions associated with the source and submitted prior to submission of the current natural language question;
determining, by a first question encoder of the database system, and based on the current natural language question, a first question model output comprising question vectors, the first question encoder employing a first bidirectional long-short-term memory (BiLSTM) model to generate a set of question vectors based on n-gram scores for n-grams in the current natural language question, an attention operation is conducted on the set of question vectors to generate an attention weighted set of question vectors, a concatenation operation is performed on the attention weighted set of question vectors to generate a concatenated set of question vectors, and the first question encoder employs a second BILSTM model to generate, based on the concatenated set of question vectors, the question vectors;
determining, by a second question encoder of the database system and based on one or more questions of the set of prior natural language questions, a second question model output comprising context parameters;
determining, by a third question encoder of the database system and based on the question vectors and the context parameters, a set of concatenated question vectors for the question vector and the context parameters;
determining, by the database system, a selected database corresponding to the current natural language question, the selected database comprising features having features names and feature values;
determining, by a table encoder of the database system and based on the features of the selected database, a table encoder model output comprising word vectors;
determining, by decoder of the database system and based on the concatenated question vectors and the word vectors, a set of strings comprising a feature name of the feature names of the data table and a database language operator;
determining, by a transformer model of the database system and based on the set of strings and the database language operator, a set of values;

generating, by the database system based on the set of strings and the set of values, a database language query for accessing data stored in a database; and executing, by the database system, the database language query to retrieve, from a datastore, a set of data corresponding to the database language query, wherein the set of data retrieved is configured to be presented to a user in response to the execution of the database language query.

16. The medium of claim 15, wherein the second question encoder employs a BiLSTM model to determine the second question model output, the third question encoder employs a BiLSTM model to determine the set of concatenated question vectors, and the table encoder employs a BiLSTM model to determine table encoder model output.

* * * * *